(12) United States Patent
Kim et al.

(10) Patent No.: US 8,072,169 B2
(45) Date of Patent: Dec. 6, 2011

(54) METHOD OF CONTROLLING WASHING MACHINE AND MOTOR

(75) Inventors: Myung Chul Kim, Yongin-si (KR); Tae Ho Yoon, Suwon-si (KR); Hyun Bae Kim, Yongin-si (KR); Sang Jun Lee, Gwacheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 519 days.

(21) Appl. No.: 12/285,945

(22) Filed: Oct. 16, 2008

(65) Prior Publication Data

US 2010/0045226 A1    Feb. 25, 2010

(30) Foreign Application Priority Data

Aug. 19, 2008 (KR) ........................ 10-2008-0080672

(51) Int. Cl.
*G01R 31/00* (2006.01)
*G01R 31/02* (2006.01)

(52) U.S. Cl. ... 318/490; 318/471; 318/472; 324/765.01; 324/545; 324/537; 73/66

(58) Field of Classification Search .............. 361/25, 361/23, 30, 33, 1; 318/471, 472, 490; 324/500, 324/71.1, 65, 765.01, 545, 537; 338/7; 331/34, 331/1 R; 73/66; 369/60.01, 61, 62; 332/117, 332/106, 144, 149, 118; 702/57
See application file for complete search history.

(56) References Cited

U.S. PATENT DOCUMENTS

| | | | | |
|---|---|---|---|---|
| 4,156,842 A * | 5/1979 | Huang et al. | ................ | 324/615 |
| 4,510,548 A * | 4/1985 | Boothman | ................ | 361/25 |
| 4,677,361 A * | 6/1987 | Yonemoto | ................ | 318/805 |
| 4,851,782 A * | 7/1989 | Jeerings et al. | ................ | 324/520 |
| 5,301,522 A * | 4/1994 | Ikemizu et al. | ................ | 68/12.06 |
| 5,778,703 A * | 7/1998 | Imai et al. | ................ | 68/12.02 |
| 5,959,431 A * | 9/1999 | Xiang | ................ | 318/811 |
| 6,065,170 A * | 5/2000 | Jang | ................ | 8/158 |
| 6,066,934 A * | 5/2000 | Kaitani et al. | ................ | 318/490 |
| 6,163,912 A * | 12/2000 | Matsuura et al. | ................ | 8/159 |
| 6,341,507 B1 * | 1/2002 | Rode et al. | ................ | 68/12.16 |
| 6,483,319 B1 * | 11/2002 | Kendig et al. | ................ | 324/551 |
| 6,898,951 B2 * | 5/2005 | Severns et al. | ................ | 68/5 C |
| 7,071,641 B2 * | 7/2006 | Arai et al. | ................ | 318/400.02 |
| 7,830,104 B2 * | 11/2010 | Takeuchi | ................ | 318/400.01 |
| 7,891,971 B2 * | 2/2011 | Schmidt et al. | ................ | 431/9 |
| 2005/0057212 A1 * | 3/2005 | Harbaugh et al. | ................ | 318/809 |

FOREIGN PATENT DOCUMENTS

KR    10-2003-0002562    1/2003

* cited by examiner

*Primary Examiner* — Rita Leykin
(74) *Attorney, Agent, or Firm* — Staas & Halsey LLP

(57) ABSTRACT

A method of controlling a washing machine and a motor determines whether a BLDC motor is in a normal state in software without hardware and a user is notified of an abnormal state of the BLDC motor if the BLDC motor is in an abnormal state, thereby ensuring safety. When the motor is rotated, the state of the motor is determined by applying harmonics to a voltage that is applied to a motor and analyzing an output frequency characteristic. When the motor is stopped, the state of the motor is determined by estimating the temperature of the motor.

25 Claims, 8 Drawing Sheets

(A)

(B)

FIG. 4
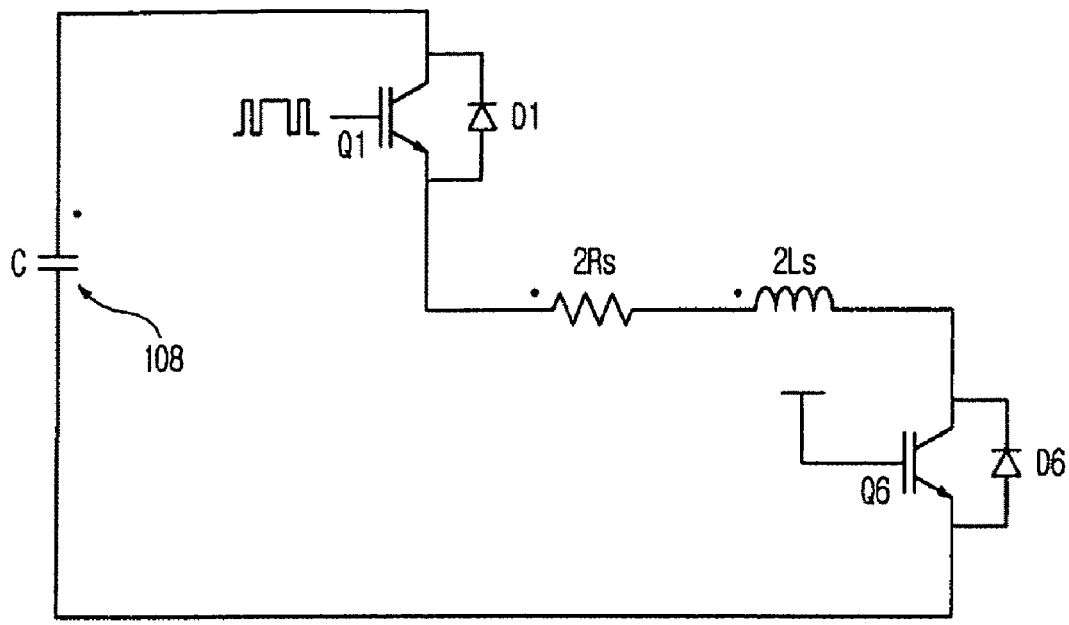
(A)
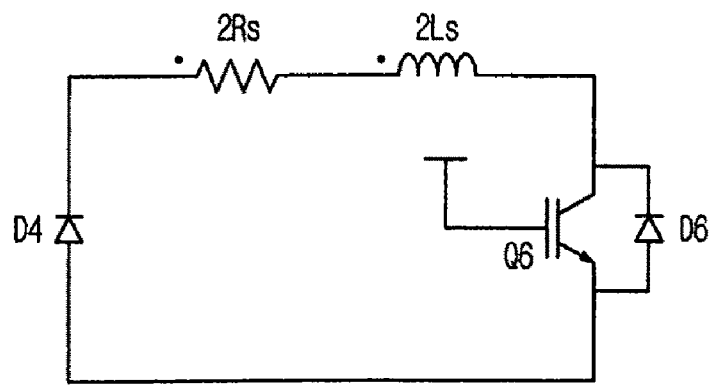
(B)

FIG. 5
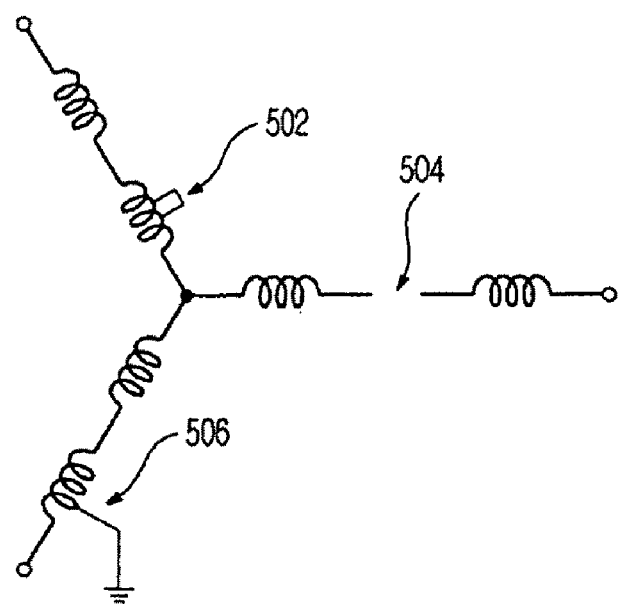
(A)
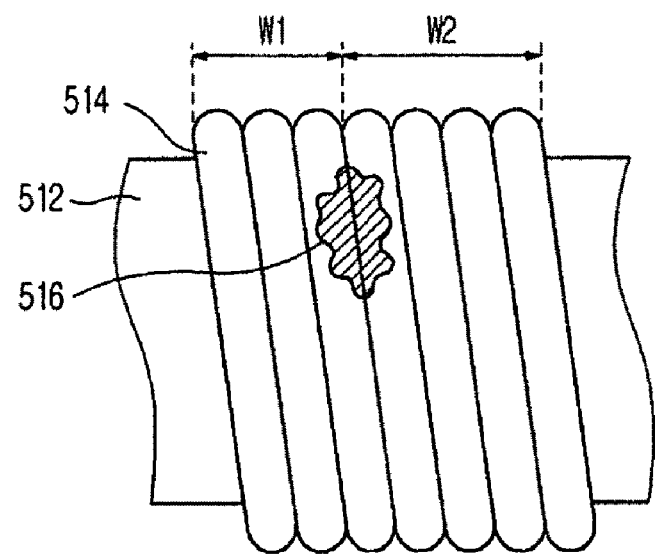
(B)

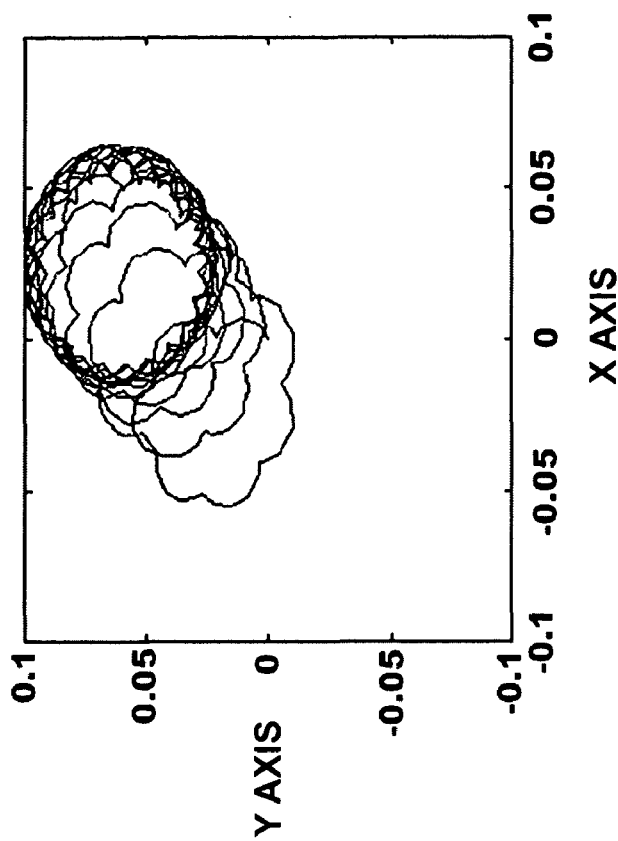
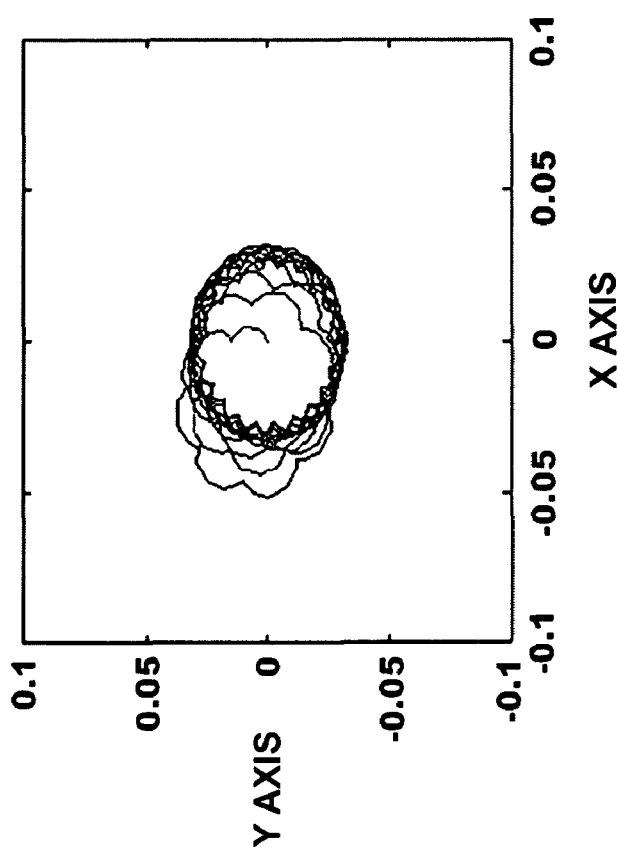

METHOD OF CONTROLLING WASHING MACHINE AND MOTOR

CROSS-REFERENCE TO RELATED APPLICATIONS

This application claims the benefit of Korean Patent Application No. 2008-80672, filed on Aug. 19, 2008 in the Korean Intellectual Property Office, the disclosure of which is incorporated herein by reference.

BACKGROUND

1. Field

The present invention relates to a method of controlling a washing machine and a motor, and, more particularly, to a method of determining whether a motor of a washing machine is in a normal state.

2. Description of the Related Art

A brushless direct current motor (hereinafter, referred to as a BLDC motor) indicates a DC motor in which an electric commutator mechanism is mounted instead of a mechanical contact portion such as a brush or a commutator. Accordingly, the BLDC motor is also called a commutatorless motor.

The BLDC motor is characterized in that noise due to the brush does not occur because the brush is not included. Since the mechanical contact portion such as the commutator is not included, a motor having high-velocity rotation and long life span can be realized. In addition, the BLDC motor has excellent characteristics as a control motor, for example, an excellent acceleration property, a large start-up torque, linear characteristics of a voltage variation, and linearity of an output torque vs. an input current.

Due to the above-described excellent characteristics, the BLDC motor is widely used in household appliances, vehicles, aerospace equipments, mechanical appliances, and factory automation equipments. In particular, since the BLDC motor has a large start-up torque and high-velocity rotational force, the BLDC motor is used in household appliances such as a washing machine for starting up a spin basket, in which wet laundry is contained, for a short period of time and rotating the spin basket at a high velocity.

SUMMARY

Therefore, in an aspect of the invention a method determines whether a BLDC motor of a washing machine is in a normal state in software without hardware and notifying an abnormal state of the BLDC motor if the BLDC motor is in the abnormal state so as to ensure safety.

Additional aspects and/or advantages of the invention will be set forth in part in the description which follows and, in part, will be apparent from the description, or may be learned by practice of the invention.

In accordance with the invention, the above and/or other aspects is achieved by a method of controlling a washing machine, the method including: rotating a motor of the washing machine; and applying harmonics to a voltage that is applied to the motor, analyzing an output frequency characteristic, and determining the state of the motor.

The frequency of the harmonics applied to the voltage that is applied to the motor may be higher than an operation frequency of the motor.

The frequency of the harmonics may be greater than or equal to 10 times the operation frequency of the motor.

At least one of an abnormal state of an armature winding of the motor or an abnormal state of a magnet may be determined by analyzing the frequency characteristic of the motor.

According to another aspect of the invention, a method of controlling a washing machine, includes: performing a washing operation; applying harmonics to a voltage that is applied to a motor, analyzing an output frequency characteristic, and determining the state of the motor, when the motor of the washing machine is rotated; and stopping the washing operation if it is determined that the motor is in an abnormal state.

The analyzing of the frequency characteristic of the motor may be performed in at least one of a washing mode, a rinsing mode, and a spin-drying mode, in which the motor is rotated.

The frequency of the harmonics applied to the voltage that is applied to the motor may be higher than an operation frequency of the motor.

The frequency of the harmonics may be greater than or equal to 10 times the operation frequency of the motor.

At least one of an abnormal state of an armature winding of the motor or an abnormal state of a magnet may be determined by analyzing the frequency characteristic of the motor.

According to another aspect of the invention, a method controls a washing machine, the method including: performing a washing operation; applying harmonics to a voltage that is applied to a motor, analyzing an output frequency characteristic, and determining the state of the motor, when the motor of the washing machine is rotated; estimating the temperature of the motor and determining the state of the motor, when the motor of the washing machine is stopped; and stopping the washing operation if it is determined that the motor is in an abnormal state.

The analyzing of the frequency characteristic of the motor may be performed in at least one of a washing mode, a rinsing mode, and a spin-drying mode, in which the motor is rotated.

The estimating of the temperature of the motor may be performed in at least one of a washing mode and a rinsing mode having a stop period of the motor.

The stop period of the motor may be at least one of a stop period of the motor before the washing mode and the rinsing mode are started, a temporal stop period of the motor according to the switching of the rotation of a spin basket in the washing mode and the rinsing mode, and a stop period of the motor in which water is supplied in the washing mode and the rinsing mode.

The frequency of the harmonics applied to the voltage that is applied to the motor may be higher than an operation frequency of the motor.

The frequency of the harmonics may be greater than or equal to 10 times the operation frequency of the motor.

At least one of an abnormal state of an armature winding of the motor or an abnormal state of a magnet may be determined by analyzing the frequency characteristic of the motor.

The estimating of the temperature of the motor may include calculating the winding resistance of the motor and estimating the temperature of the motor from the winding resistance of the motor.

The winding resistance of the motor may be calculated from the following Equation:

$$R = \frac{V_{dc} - 2 \cdot V_{ce,on}) \cdot D + (-V_{ce,on} - V_{ak,on}) \cdot (1-D)}{2 \cdot I_{as,dc}}$$

where, $V_{dc}$ denotes a DC-link voltage, $V_{ce,on}$ denotes a voltage drop of a switching element, $V_{ak,on}$ denotes the voltage drop of a diode of the switching element, D denotes a ON-time duty ratio of a switching signal (1-D denotes an OFF-time duty ratio), and $I_{as,dc}$ denotes a DC-link current.

The estimated temperature $T_s$ of the motor using the winding resistance of the motor is obtained from the following Equation.

$$T_s = T_{s0} + \frac{R - R_0}{\alpha \cdot R_0}$$

where, $R_0$ denotes reference winding resistance, $T_{s0}$ denotes a measured temperature at the reference winding resistance $R_0$ and α denotes a resistance-temperature constant (1/° C.).

The winding resistance may be calculated in a state in which two phase windings of the motor are electrically coupled.

According to another aspect of the invention, a method controls a motor, the method including: applying harmonics to a voltage that is applied to a motor, analyzing an output frequency characteristic, and determining the state of the motor, when the motor is rotated; estimating the temperature of the motor and determining the state of the motor, when the motor is stopped; and stopping a washing operation if it is determined that the motor is in an abnormal state.

The frequency of the harmonics applied to the voltage that is applied to the motor may be higher than an operation frequency of the motor.

The frequency of the harmonics may be greater than or equal to 10 times the operation frequency of the motor.

At least one of an abnormal state of an armature winding of the motor or an abnormal state of a magnet may be determined by analyzing the frequency characteristic of the motor.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a diagram showing the equivalent circuits of the inverter and the BLDC motor according to ON/OFF of a switching element Q1 of the inverter shown in FIG. 3;

FIG. 5 is a view showing a variation in turn ratio of a stator winding according to a winding short-circuit in accordance with an embodiment of the present invention;

FIG. 6 is a view showing the result of determining the state of the motor by analyzing a frequency according to an embodiment of the present invention.

DETAILED DESCRIPTION OF EMBODIMENTS

Figure 1:
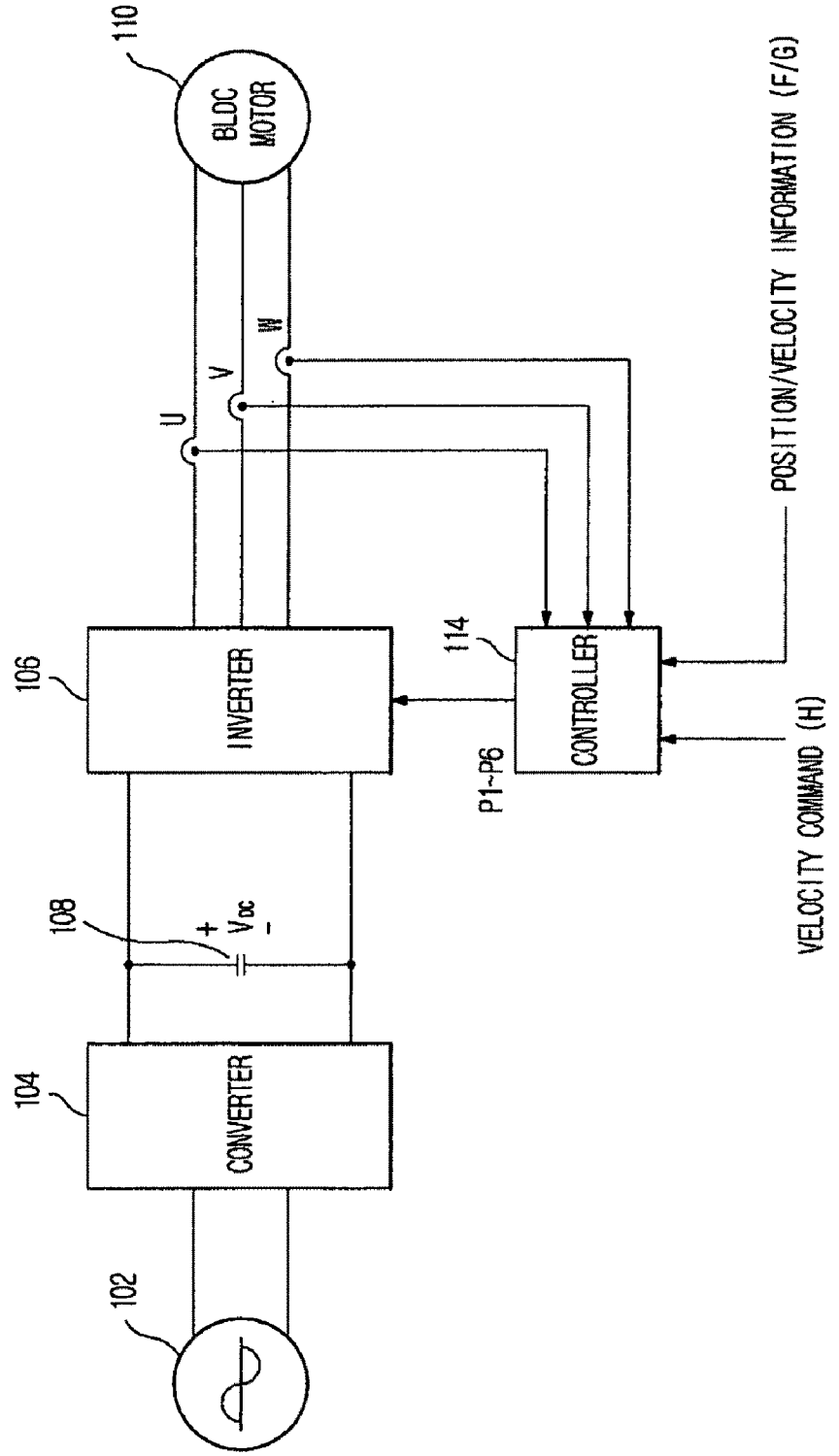
FIG. 1 is a block diagram showing an apparatus for controlling a BLDC motor according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

The exemplary embodiments of the present invention will be described with reference to FIGS. 1 to 7B. First, FIG. 1 is a block diagram illustrating an apparatus to control a BLDC motor according to an embodiment of the present invention. As shown in FIG. 1, a power converting device including a converter 104, a DC-link capacitor 108 and an inverter 106 converts an alternating-current (AC) voltage received from a AC power supply source 102 into a DC voltage, inverts the DC voltage into three-phase AC voltages U, V and W, and supplies the three-phase AC voltages to the BLDC motor 110. The converter 104 converts the AC voltage into the DC voltage, and the inverter 106 inverts the DC voltage into the three-phase AC voltages U, V and W having a pulse shape.

The current information of the phases of the three-phase AC voltages supplied from the inverter 106 to the BLDC motor 110 is supplied to a controller 114. The controller 114 generates inverter control signals P1 to P6 to control the rotational velocity of the BLDC motor 110 by referring to the current information of the phases of the three-phase AC voltages and the position/velocity information F/G of a rotor of the BLDC motor 110. The inverter control signals P1 to P6 generated by the controller 114 are used to control the current amounts and the switching time points of the phases of the three-phase AC voltages U, V and W output from the inverter 106 to the BLDC motor 110 such that the rotational velocity of the BLDC motor 110 is adjusted according to a velocity command H which is externally input.

Figure 2:
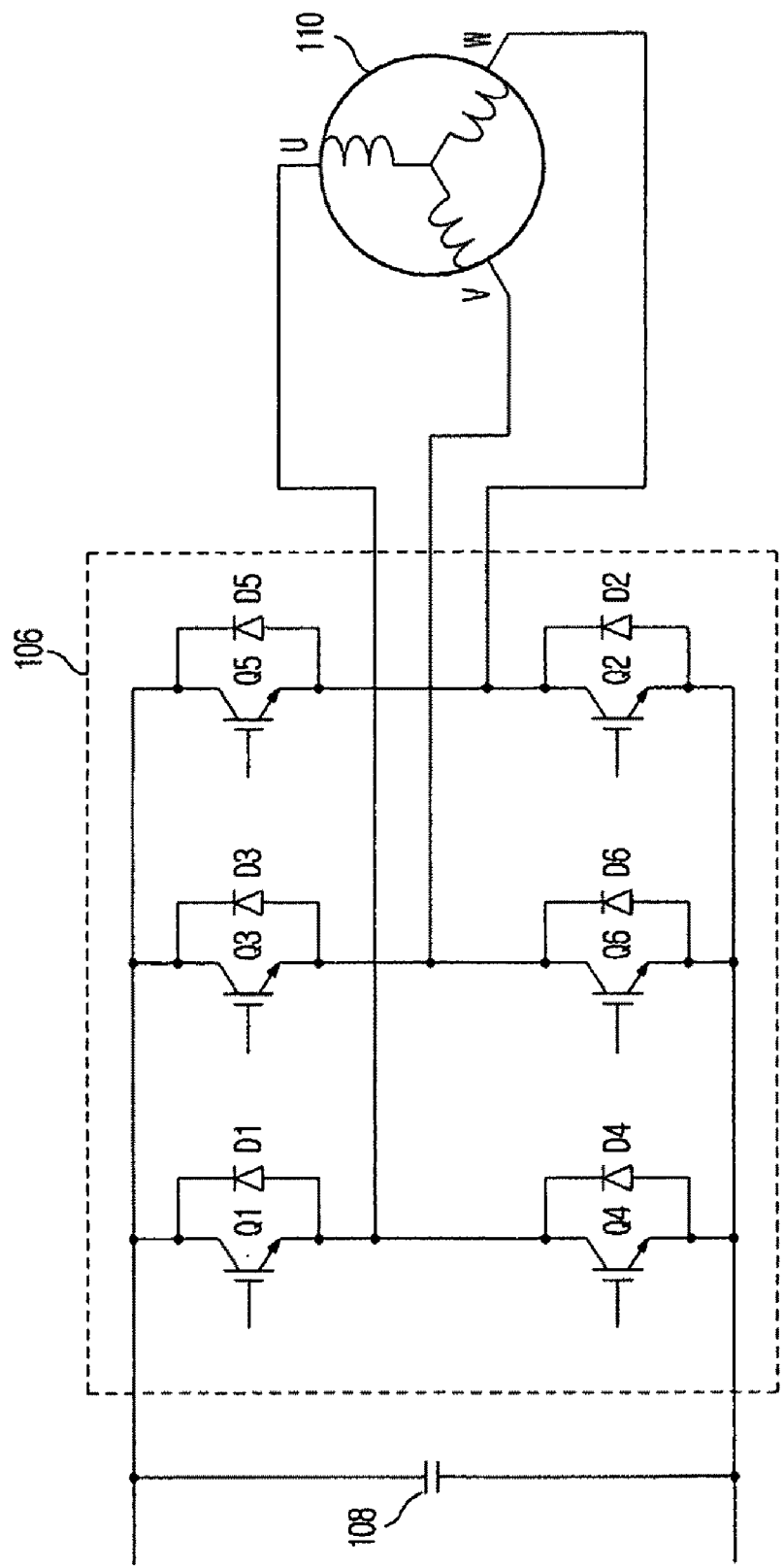
FIG. 2 is a circuit diagram showing the configuration of an inverter shown in FIG. 1.

FIG. 2 is a circuit diagram showing the configuration of a three-phase full-bridge inverter in the apparatus for controlling the BLDC motor shown in FIG. 1. Switching elements, that is, transistors Q1 to Q6, are switched by the inverter control signals P1 to P6 of FIG. 1 such that the phase currents are switched.

Figure 3:
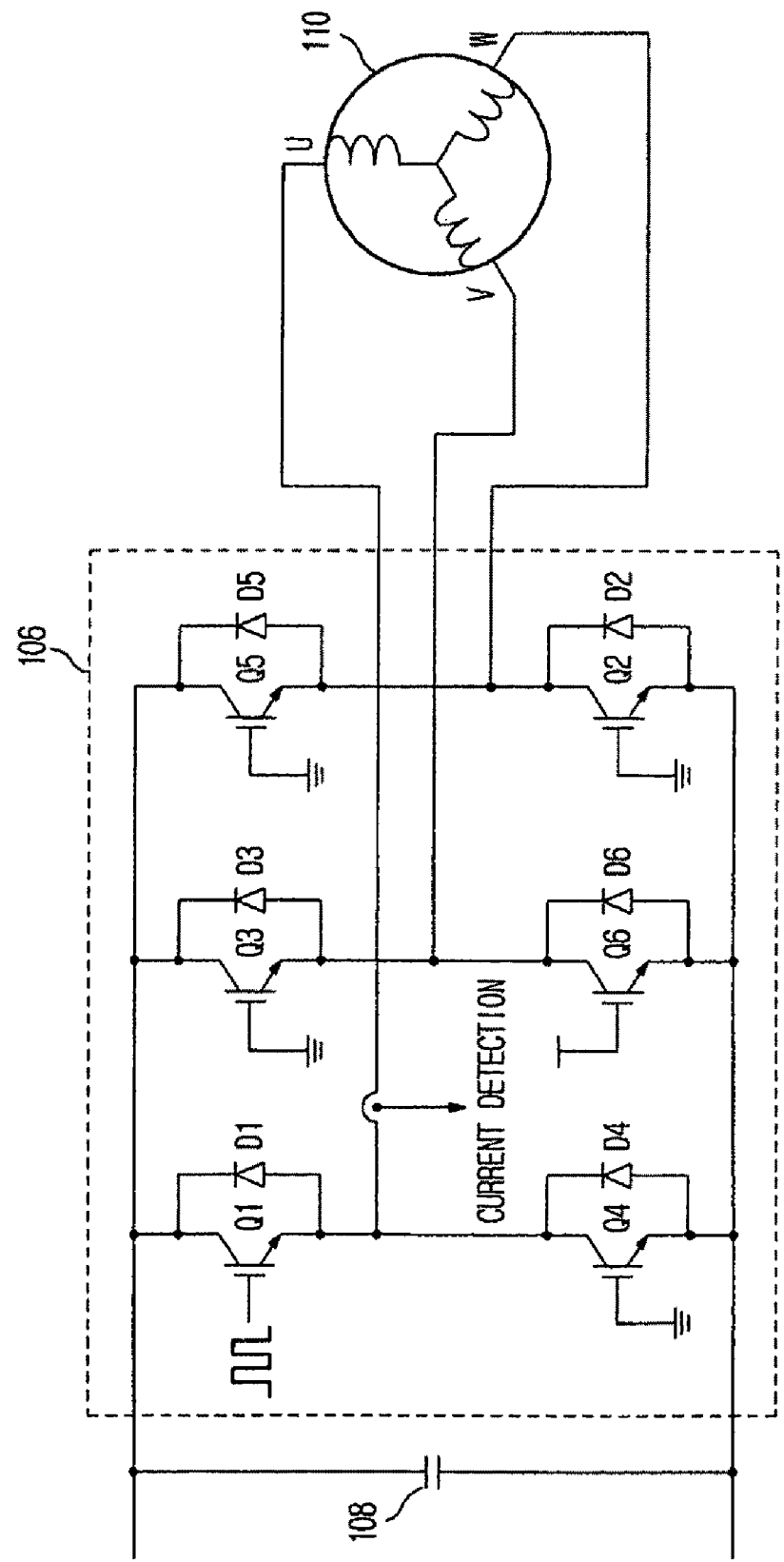
FIG. 3 is a circuit diagram showing the state of the inverter when winding resistance is measured, according to an embodiment of the present invention.

FIG. 3 is a circuit diagram showing the state of the inverter when winding resistance is measured, according to an embodiment of the present invention. In the embodiment of the present invention, to measure the winding resistance, the two phase currents flow in the BLDC motor 110. At this time, the winding resistance of the BLDC motor 110 is measured.

As shown in FIG. 3, if a switching signal having a pulse shape is applied to the transistor Q1 in a state in which the transistor Q6 is turned on and the transistors Q2 to Q5 are turned off, the transistor Q1 is turned on/off such that the U- and V-phase currents flow. If the transistor Q1 is turned on, the current supplied from the converter 104 flows to ground via the transistor Q1, the U- and V-phase windings and the transistor Q6. At this time, the current of the DC-link capacitor 108 is discharged. In contrast, if the transistor Q1 is turned off, the supply of the current is stopped, but the current flowing in the BLDC motor 110 circulates through a diode D4, the U- and V-phase windings of the BLDC motor 110 and the transistor Q6 due to a current flow maintenance property. At this time, the converter 104 and the DC-link capacitor 108 are electrically disconnected from the inverter 106. The equivalent circuit of the inverter 106 and the BLDC motor 110 when the transistor Q1 is turned on and the equivalent circuit of the inverter 106 and the BLDC motor 110 when the transistor Q1 is turned off are shown in FIG. 4.

FIG. 4 is a diagram showing the equivalent circuits of the inverter and the BLDC motor according to ON/OFF of the switching element Q1 of the inverter shown in FIG. 3. FIG. 4A shows the equivalent circuit of the inverter 106 and the BLDC motor 110 when the transistor Q1 is turned on and FIG. 4B shows the equivalent circuit of the inverter 106 and the BLDC motor 110 when the transistor Q1 is turned off.

As shown in FIG. 4A, when the transistor Q1 is turned on, the current discharged from the DC-link capacitor 108 flows through two transistors Q1 and Q6 which are turned on. Resistance Rs and an inductance Ls indicate the resistance and the inductance of the winding which is electrically coupled, respectively. Since the two phase (U and V) windings are electrically coupled, the BLDC motor has the resistance 2Rs and the inductance 2Ls. In FIG. 4B, the current circulates through the diode D4 and the transistor Q6 instead of the transistor Q1. Even in this case, the BLDC motor 110 has the resistance 2Rs and the inductance 2Ls.

The winding resistance R of the BLDC motor 110 can be expressed by Equation 1 from the equivalent circuits.

$$R = \frac{V_{dc} - 2 \cdot V_{ce,on}) \cdot D + (-V_{ce,on} - V_{ak,on}) \cdot (1 - D)}{2 \cdot I_{as,dc}} \quad \text{Equation 1}$$

In Equation 1, $V_{dc}$ denotes a DC-link voltage, that is, a voltage across the DC-link capacitor 108, $V_{ce,on}$ denotes voltage drops of the transistors Q1 and Q6 which are the switching elements, $V_{ak,on}$ denotes the voltage drop of the diode D4, D denotes an ON-time duty ratio of the switching signal for turning on/off the transistor Q1, and $I_{as,dc}$ denotes a DC-link current (1-D denotes an OFF-time duty ratio of the switching signal).

An estimated temperature $T_s$ of the BLDC motor 110 using the winding resistance R is obtained by the following Equation.

$$T_s = T_{s0} + \frac{R - R_0}{\alpha \cdot R_0} \quad \text{Equation 2}$$

In Equation 2, $R_0$ denotes reference winding resistance, $T_{s0}$ denotes a measured temperature at the reference winding resistance $R_0$ and $\alpha$ denotes a resistance-temperature constant (1/° C.).

The winding resistance R, the estimated temperature $T_s$ and the measured temperature T of the BLDC motor 110 are shown in the following Table.

TABLE

| R (Ω) | 2.21 | 2.26 | 2.51 | 2.74 | 3.28 |
|---|---|---|---|---|---|
| Estimated temperature $T_s$ (° C.) | −3.7 | 1.4 | 27.0 | 50.6 | 106.6 |
| Measured temperature T (° C.) | −5 | 0 | 26 | 50 | 105 |

As shown in Table, the estimated temperature $T_s$ of the BLDC motor 110 estimated on the basis of the winding resistance R is substantially equal to the measured temperature T. Accordingly, the temperature of the BLDC motor 110 is estimated from the winding resistance R such that it is determined whether the BLDC motor 110 is in a normal state. To determine whether the BLDC motor 110 is in a normal state on the basis of the temperature, the temperature range of the BLDC motor 110 when the BLDC motor is in an abnormal state due to the deterioration of the winding such as the short-circuit of the winding, that is, an abnormal temperature range, was previously obtained by experiments. It is determined whether the temperature of the BLDC motor 110 estimated from the winding resistance R is in the abnormal temperature range to determine whether the BLDC motor 110 is in the normal state. Accordingly, to determine whether the BLDC motor 110 is in the normal state, it is preferable that the information on the abnormal temperature range of the BLDC motor 110 is previously obtained and stored in the controller 114.

FIG. 5 is a view showing a variation in turn ratio of a stator winding according a winding short-circuit in accordance with an embodiment of the present invention. As shown in FIG. 5A, the winding short-circuit 502 indicates a state in which an insulating film of the winding is damaged and neighboring turns are short-circuited. If the winding short-circuit 502 becomes serious, a winding open-circuit 504 and a winding ground 506 may be generated. The winding open-circuit 504 indicates a state in which excessive current flows due to the winding short-circuit, and thus, the winding is damaged and electrically open-circuited. The winding ground 506 indicates a state in which the insulating film of the winding is damaged and the winding is connected to ground.

FIG. 5B shows a state in which an insulating film of a winding 514 wound on a core 512 is damaged and a winding short-circuit 516 is generated. If the winding short-circuit 516 is generated, the winding resistance and the winding inductance of the phase winding, in which the winding short-circuit 516 is generated, vary by a short-circuit ratio (W1:W2) determined according to a position in which the winding short-circuit 516 is generated. The inductance variation can be detected by the following method. If harmonics of which the frequency is greater than or equal to 10 times an operation frequency of the voltage that is applied to the BLDC motor 110 are applied, a winding resistance variation is ignored, and a new frequency band is detected by the inductance variation. When this new frequency band is Fast Fourier Transformed and is graphed, whether the winding short-circuit 516 is generated is determined by the frequency variation.

A frequency band when the BLDC motor 110 is in the normal state, that is, a normal frequency band, is previously obtained. If the measured frequency band of the BLDC motor 110 is larger than the normal frequency band by a predetermined value, it is determined that the BLDC motor 110 has deteriorated. Since the inductance value of a magnet varies according to a demagnetization ratio and a damage degree of the magnet (rotor), the demagnetization and the damage of the magnet (rotor) are determined using the method of applying the harmonics.

FIG. 6 is a view showing the result of determining the state of the motor by analyzing a frequency according to an embodiment of the present invention. If the BLDC motor 110 is in the normal state, the frequency distribution is concentrated on a central portion of a coordinate system as shown in FIG. 6A. In contrast, if the BLDC motor 110 is in the abnormal state, the frequency distribution is significantly shifted from the central portion of the coordinate system as shown in FIG. 6B. Accordingly, it is determined whether the BLDC motor 110 is in the normal state, by the frequency characteristic which varies by applying the harmonics.

Figure 7A:
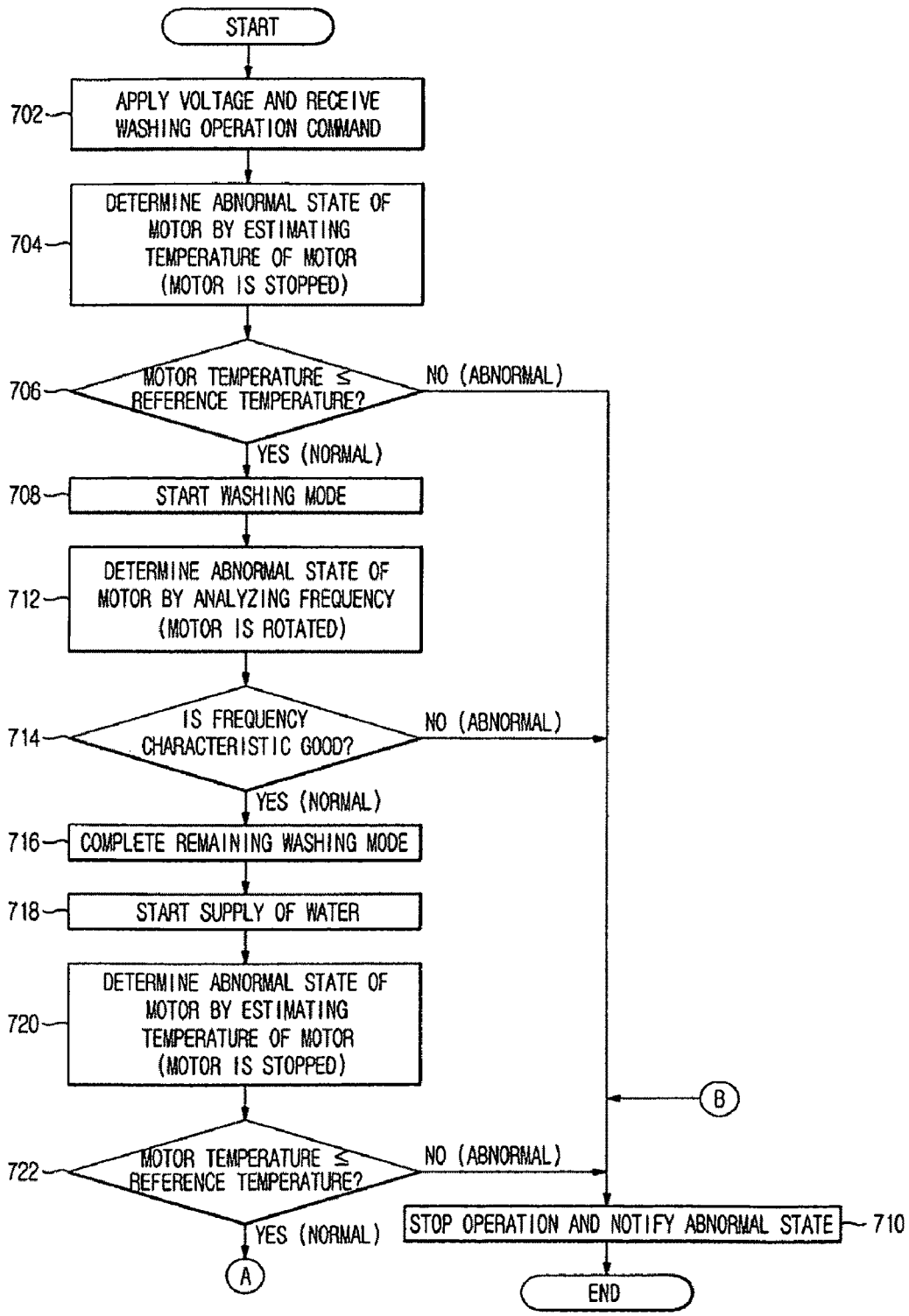
FIGS. 7A and 7B are flowcharts illustrating a method of controlling a washing machine according to an embodiment of the present invention.
Figure 7B:
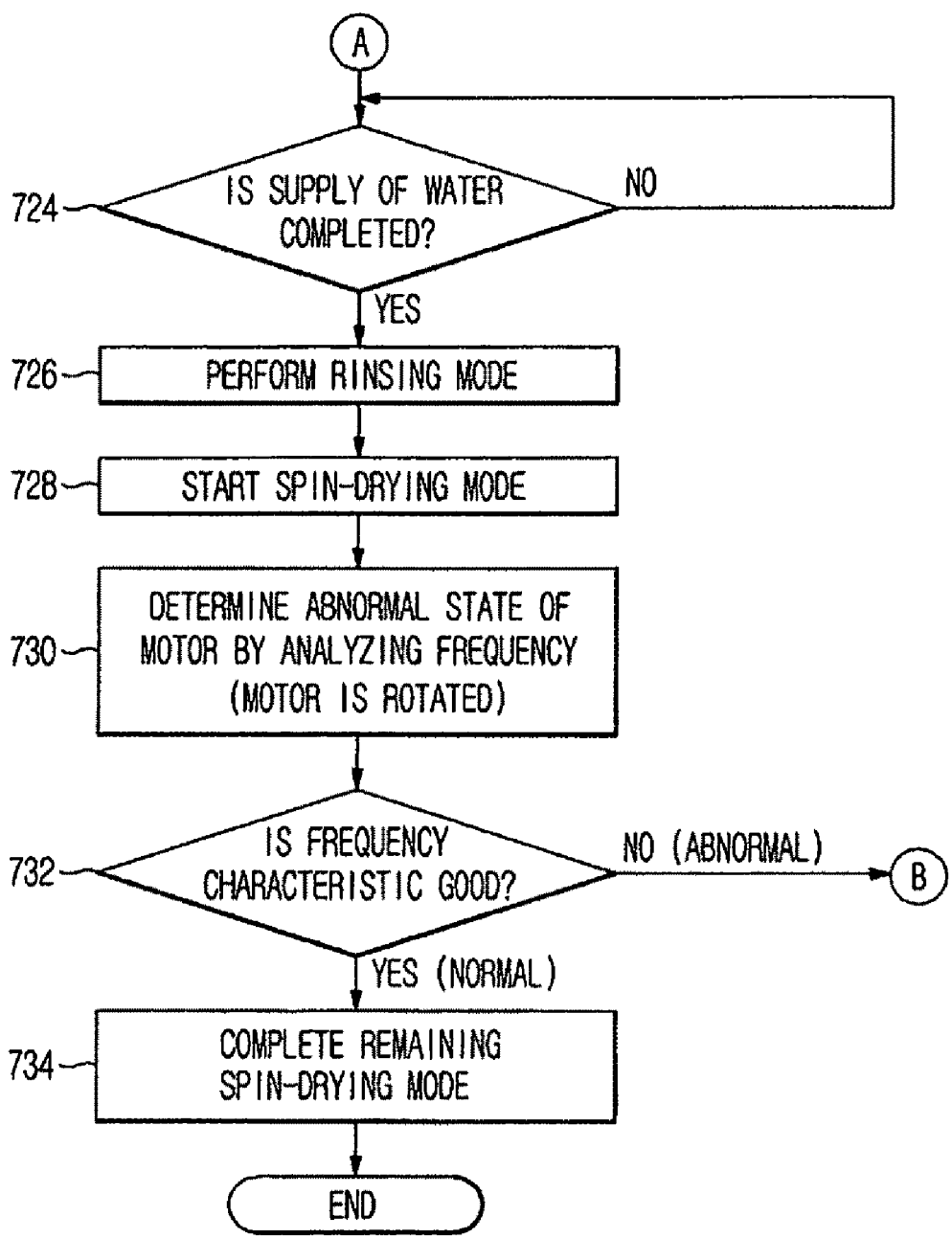

FIGS. 7A and 7B are flowcharts illustrating a method of controlling a washing machine according to an embodiment of the present invention. While a washing operation is performed, it is determined whether the motor is in the normal state by estimating the temperature of the BLDC motor 110 in a period in which the BLDC motor 110 is not rotated, and it is determined whether the motor is in the normal state by analyzing the frequency in a period in which the BLDC motor 110 is rotated.

As shown in FIG. 7A, when a user presses a power button, a voltage is applied to all devices of the washing machine. When the user presses an operation button, a washing operation command is generated and is supplied to the controller 114 of the washing machine 114 (702). Since the BLDC motor 110 is not rotated after the voltage is supplied, and the washing operation command is generated before a washing mode is performed, it is determined whether the motor is in the normal state by estimating the temperature of the motor while the BLDC motor 110 is stopped (704). If the temperature of the motor is equal to or less than a predetermined reference temperature (Yes of 706), it is determined that the BLDC motor 110 is in the normal state and the washing mode has started (708). In contrast, if the temperature of the motor exceeds the predetermined reference temperature (No of 706), it is determined that the motor is in the abnormal state, the operation is stopped, and a user is notified of an abnormal state (710). The abnormal state may be notified using an alert sound, an alert light, or an alert message displayed on a liquid crystal display device.

Since the BLDC motor 110 is rotated to rotate a spin basket or a pulsator while the washing mode is performed, it is determined whether the motor is in the normal state by analyzing the frequency when the BLDC motor 110 is rotated in the washing mode (712). If the frequency characteristic of the BLDC motor 110 is good (Yes of 714), it is determined that the BLDC motor 110 is in the normal state and the remaining washing mode is completed (716). In contrast, if the frequency characteristic of the BLDC motor 110 is insufficient (No of 714), it is determined that the BLDC motor 110 is in the abnormal state, the operation is stopped, and the user is notified of an abnormal state (710).

If the remaining washing mode is completed, the supply of water to be used in the washing mode is started (718). Since the BLDC motor 110 is not rotated while the water is supplied, it is determined whether the motor is in the normal state by estimating the temperature of the motor (720). If the temperature of the motor is equal to or less than the predetermined reference temperature (Yes of 722), it is determined that the BLDC motor 110 is in the normal state and the supply of the water is continuously performed. In contrast, if the temperature of the motor exceeds the predetermined reference temperature (No of 722), it is determined that the BLDC motor 110 is in the abnormal state, the operation is stopped, and the abnormal state is notified (710). Although the temperature of the BLDC motor 110 is estimated while the water is supplied, the temperature of the motor may be estimated in a stop period of the BLDC motor 110 which is generated according to the switching of the forward/backward rotation of the spin basket while the washing mode is performed.

Subsequently, in FIG. 7B, if the supply of the water is completed (Yes of 724), a rinsing mode for rinsing a detergent remaining in the laundry is performed (726). If the rinsing mode is completed, a spin-drying mode to discharge the water absorbed in the laundry is started (728). Since the BLDC motor 110 is rotated in the spin-drying mode, it is determined whether the motor is in the normal state by analyzing the frequency when the BLDC motor 110 is rotated in the spin-drying mode (730). If the frequency characteristic of the BLDC motor 110 is sufficient (Yes of 732), it is determined that the BLDC motor 110 is in the normal state, the remaining spin-drying mode is completed, and the washing operation is completed (734). In contrast, if the frequency characteristic of the BLDC motor 110 is insufficient (No of 732), it is determined that the BLDC motor 110 is in the abnormal state, the operation is stopped, and the user is notified of an abnormal state (710).

In FIG. 7B, since the rinsing mode includes the rotation period, the motor stop period (according to the switching of the forward/backward rotation of the motor), the water supply period of the BLDC motor 110, in the rinsing mode, it may be determined whether the BLDC motor 110 is in the normal state by estimating the temperature of the BLDC motor 110 and analyzing the frequency, in similar fashion to the washing mode.

Although it is determined whether the motor is in the normal state in an actual washing operation of a washing machine, which is a completed product, in FIGS. 7A and 7B, it may be determined whether the motor is in the normal state by estimating the temperature of the motor while the BLDC motor 110 is stopped and by analyzing the frequency while the BLDC motor 110 is intentionally rotated, in a process of manufacturing the washing machine.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling a washing machine, the method comprising:
   rotating a motor of the washing machine; and
   applying harmonics to a voltage that is applied to the motor, detecting a frequency of the harmonics applied to the voltage that is applied to the motor while applying the harmonics to the voltage, analyzing an output frequency characteristic of the voltage which the harmonics is applied, and determining a state of the motor,
   wherein analyzing the output frequency characteristic of the voltage includes analyzing the frequency distribution concentrated on a coordinate system.

2. The method according to claim 1, wherein the frequency of the harmonics applied to the voltage that is applied to the motor is higher than an operation frequency of the motor.

3. The method according to claim 2, wherein the frequency of the harmonics is greater than or equal to 10 times the operation frequency of the motor.

4. The method according to claim 1, wherein at least one of an abnormal state of an armature winding of the motor or an abnormal state of a magnet is determined by analyzing the frequency characteristic of the voltage which the harmonics is applied.

5. A method of controlling a washing machine, the method comprising:
   performing a washing operation;
   applying harmonics to a voltage that is applied to a motor, detecting a frequency of the harmonics applied to the voltage that is applied to the motor while applying the harmonics to the voltage, analyzing an output frequency characteristic of the voltage which the harmonics is applied, and determining a state of the motor when the motor of the washing machine is rotated; and
   stopping the washing operation if it is determined that the motor is in an abnormal state,
   wherein analyzing the output frequency characteristic of the voltage includes analyzing the frequency distribution concentrated on a coordinate system.

6. The method according to claim 5, wherein the analyzing of the frequency characteristic of the voltage which the harmonics is applied, is performed in at least one of a washing mode, a rinsing mode, and a spin-drying mode, in which the motor is rotated.

7. The method according to claim 5, wherein the frequency of the harmonics applied to the voltage that is applied to the motor is higher than an operation frequency of the motor.

8. The method according to claim 7, wherein the frequency of the harmonics is greater than or equal to 10 times the operation frequency of the motor.

9. The method according to claim 5, wherein at least one of an abnormal state of an armature winding of the motor or an abnormal state of a magnet is determined by analyzing the frequency characteristic of the voltage which the harmonics is applied.

10. A method of controlling a washing machine, the method comprising:
performing a washing operation;
applying harmonics to a voltage that is applied to a motor, detecting a frequency of the harmonics applied to the voltage that is applied to the motor while applying the harmonics to the voltage, analyzing an output frequency characteristic of the voltage which the harmonics is applied, and determining a state of the motor when the motor of the washing machine is rotated;
estimating the temperature of the motor and determining the state of the motor when the motor of the washing machine is stopped; and
stopping the washing operation if it is determined that the motor is in an abnormal state,
wherein analyzing the output frequency characteristic of the voltage includes analyzing the frequency distribution concentrated on a coordinate system.

11. The method according to claim 10, wherein the analyzing of the frequency characteristic of the voltage which the harmonics is applied, is performed in at least one of a washing mode, a rinsing mode, and a spin-drying mode, in which the motor is rotated.

12. The method according to claim 10, wherein the estimating of the temperature of the motor is performed in at least one of a washing mode and a rinsing mode having a stop period of the motor.

13. The method according to claim 12, wherein the stop period of the motor is at least one of a stop period of the motor before the washing mode and the rinsing mode are started, a temporal stop period of the motor according to the switching of the rotation of a spin basket in the washing mode and the rinsing mode, and a stop period of the motor in which water is supplied in the washing mode and the rinsing mode.

14. The method according to claim 10, wherein the frequency of the harmonics applied to the voltage that is applied to the motor is higher than an operation frequency of the motor.

15. The method according to claim 14, wherein the frequency of the harmonics is greater than or equal to 10 times the operation frequency of the motor.

16. The method according to claim 10, wherein at least one of an abnormal state of an armature winding of the motor or an abnormal state of a magnet is determined by analyzing the frequency characteristic of the voltage which the harmonics is applied.

17. The method according to claim 10, wherein the estimating of the temperature of the motor includes calculating the winding resistance of the motor and estimating the temperature of the motor from the winding resistance of the motor.

18. The method according to claim 17, wherein the winding resistance of the motor is calculated from the following Equation $$R = \frac{V_{dc} - 2 \cdot V_{ce,on} \cdot D + (-V_{ce,on} - V_{ak,on}) \cdot (1-D)}{2 \cdot I_{as,dc}}$$

where, $V_{dc}$ denotes a DC-link voltage, $V_{ce,on}$ denotes a voltage drop of a switching element, $V_{ak,on}$ denotes the voltage drop of a diode of the switching element, D denotes a ON-time duty ratio of a switching signal (1-D denotes an OFF-time duty ratio), and $I_{as,dc}$ denotes a DC-link current.

19. The method according to claim 17, wherein the estimated temperature $T_s$ of the motor using the winding resistance of the motor is obtained from the following Equation $$T_s = T_{s0} + \frac{R - R_0}{\alpha \cdot R_0}$$

where, $R_0$ denotes reference winding resistance, $T_{s0}$ denotes a measured temperature at the reference winding resistance $R_0$ and $\alpha$ denotes a resistance-temperature constant (1/° C.).

20. The method according to claim 17, wherein the winding resistance is calculated in a state in which two phase windings of the motor are electrically coupled.

21. A method of controlling a motor, the method comprising:
applying harmonics to a voltage that is applied to a motor, detecting a frequency of the harmonics applied to the voltage that is applied to the motor while applying the harmonics to the voltage, analyzing an output frequency characteristic of the voltage which the harmonics is applied, and determining a state of the motor, when the motor is rotated;
estimating the temperature of the motor and determining the state of the motor, when the motor is stopped; and
stopping a washing operation if it is determined that the motor is in an abnormal state,
wherein analyzing the output frequency characteristic of the voltage includes analyzing the frequency distribution concentrated on a coordinate system.

22. The method according to claim 21, wherein the frequency of the harmonics applied to the voltage that is applied to the motor is higher than an operation frequency of the motor.

23. The method according to claim 22, wherein the frequency of the harmonics is greater than or equal to 10 times the operation frequency of the motor.

24. The method according to claim 21, wherein at least one of an abnormal state of an armature winding of the motor or an abnormal state of a magnet is determined by analyzing the frequency characteristic of the voltage which the harmonics is applied.

25. A method of controlling a washing machine, the method comprising:

applying harmonics to a voltage that is applied to a rotating motor of the washing machine;

detecting a frequency of the harmonics applied to the voltage that is applied to the motor while applying the harmonics to the voltage; and analyzing an output frequency characteristic of the voltage which the harmonics is applied, to determine a state of the motor, wherein analyzing the output frequency characteristic of the voltage includes analyzing the frequency distribution concentrated on a coordinate system.

* * * * *